(12) United States Patent
Hicks (10) Patent No.: US 9,098,695 B2
(45) Date of Patent: Aug. 4, 2015

(54) SECURE NOTE SYSTEM FOR COMPUTING DEVICE LOCK SCREEN

(71) Applicant: barnesandnoble.com llc, New York, NY (US)

(72) Inventor: Kourtny M. Hicks, Sunnyvale, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 0 days.

(21) Appl. No.: 13/757,389

(22) Filed: Feb. 1, 2013

(65) Prior Publication Data

US 2014/0223542 A1  Aug. 7, 2014

(51) Int. Cl.
*G06F 21/60* (2013.01)
*G06F 12/00* (2006.01)
*G11C 7/00* (2006.01)
*G06F 21/45* (2013.01)
*G06F 21/53* (2013.01)

(52) U.S. Cl.
CPC ...................................... *G06F 21/45* (2013.01)

(58) Field of Classification Search
CPC ......... G06F 21/31; G06F 21/83; G06F 21/53; G06F 21/6218; G06F 2221/2105
USPC .......... 713/168–174, 182–186, 202; 709/225, 709/229; 726/2–8, 16
See application file for complete search history.

(56) References Cited

U.S. PATENT DOCUMENTS

2010/0146235 A1\* 6/2010 Weber et al. ................... 711/165
2011/0088086 A1\* 4/2011 Swink et al. ...................... 726/7

\* cited by examiner

*Primary Examiner* — Evans Desrosiers
(74) *Attorney, Agent, or Firm* — Finch & Maloney PLLC (57) ABSTRACT

Techniques are disclosed for recording secure notes from the lock screen of a computing device. A note recording user interface may be accessed from the lock screen to allow a user to leave a note, such as a text, video, audio, or drawn note, or some combination thereof. The notes left using the note recording user interface may be saved such that only the intended recipient can access them, for example, after unlocking the computing device, thereby preventing others from seeing previously saved notes. The secure note system may include a retrieve notes function that allows users and/or recipients to retrieve the recorded notes directly from the lock screen of the computing device used to record them. The secure note system may also be configured to send notifications to inform the recipient when a secure note has been recorded (e.g., email or text message including copy of note).

16 Claims, 7 Drawing Sheets

SECURE NOTE SYSTEM FOR COMPUTING DEVICE LOCK SCREEN

FIELD OF THE DISCLOSURE

This disclosure relates to computing devices, and more particularly, to a secure note system using a computing device.

BACKGROUND

Computing devices such as computers, laptops, tablets, eReaders, mobile phones, smart phones, personal digital assistants (PDAs), video game consoles, and other such electronic devices generally have an operating system that manages the device's hardware resources and provides services or applications to an end user. The end user typically interacts with the services or applications using a user interface (UI). In most instances, the UI, and therefore the computing device, is configured to have a locked or logged-out state, where a lock/login screen is displayed until a passkey is provided (e.g., a password, pattern, or PIN). Only users that know the passkey can unlock the screen or login to access the system. The locked state may be entered into manually (e.g., by using a control-alt-delete keystroke or a lock button) or automatically (e.g., after a period of inactivity).

DETAILED DESCRIPTION

Techniques are disclosed that allow for recording secure notes from the lock screen or login screen of a computing device. A recording interface may be accessed from the lock/login screen to allow a user to leave a digital note, such as a text, video, audio, or drawn note, or some combination thereof. The notes left using the recording interface may be saved, and only the intended recipient can subsequently access them, for example, after unlocking the computing device or logging in to it. The secure note system may also be configured to send a notification to inform the recipient when a secure note has been recorded.

General Overview

When a person is away from their desk or usual space, others may desire to leave them notes for various reasons. Conventional paper-based notes, such as sticky notes, are commonly used to leave a message in a recipient's usual work or desk area. However, these notes are not secure and therefore can be read by anyone, especially in the case where multiple people come into the recipient's space to leave notes. A person may also leave an electronic note, such as a note left using a word processing application on the recipient's computer. However, such an electronic note is not secure in that it may be viewed by others. Moreover, if the recipient's computer is in a locked state, then access to such a word processing application would be prevented.

Thus and in accordance with an embodiment of the present invention, techniques are disclosed for providing a secure note system. The secure note system can allow users to leave notes for an intended recipient by selectively allowing access to a locked computing device, whereby the recipient is the only one who can access the note. In some instances, the secure note system may be a part of a recipient's computing device, such as the recipient's desktop or laptop computer, smart phone, tablet, or eReader. As will be appreciated in light of this disclosure, when referring to a recipient herein in the context of a computing device, it should be understood to include an owner of a user account on the computing device. In some embodiments, a recording interface of the secure note system may be accessed from the lock screen of a recipient's computing device, with that interface providing one or more accessible mechanisms for leaving a secure note. The notes left using the recording interface may be saved such that only the intended recipient can access them. In some cases, recipient access to stored notes is allowed by using a retrieval interface of the secure note system, which may be provided, for example, at the lock screen, after unlocking the computing device, and/or through some other suitable retrieval method such as an automatically generated communication (e.g., email or text message) that includes the saved note.

In some embodiments, the recording interface may allow a user to leave a text note, video note, audio note, drawn note, or some combination thereof from the lock screen of a recipient's computing device. The secure notes may be saved locally and/or on a server of a network/cloud based service. In some instances, the secure notes may be accessed using a viewing interface after the recipient unlocks the computing device using a unique passkey (e.g., the recipient unlocks his/her smart phone by swiping the proper unique pattern on the screen and/or entering a multi-digit code). When referring to passkeys herein in the context of unlocking a computing device and/or accessing recorded secure notes, it should be understood to include unique passwords, patterns, personal identification number (PIN), and other more advanced unlocking methods, such as face recognition and fingerprint unlocking. In some other instances, where a unique passkey is not required to unlock a locked computing device (e.g., where a smart phone is not configured with a password and simply uses a well-known gesture to unlock the device), the recorded notes may be secured by requiring a unique passkey before interacting with them (e.g., the recorded notes or viewing interface may be password protected to ensure only the recipient can access the secure notes). Numerous variations and configurations will be apparent in light of this disclosure.

User Interface and Configuration

FIGS. 1 a-d illustrate example screen shots of a locked computing device using a secure note system, in accordance with one or more embodiments of the present invention. The computing device may be any device having a user interface (UI) and capability for displaying content, such as a computer, tablet, smart phone, or eReader. The computing device may display content using various different displays, such as a built-in screen (e.g., in the case of smart phones, tablets, eReaders, and laptops), an external monitor (e.g., in the case of desktop computers), or a television screen (e.g., in the case of video game consoles). The computing device may use various different input devices, such as a mouse, keyboard, touch screen, stylus, controller, or combinations thereof. The computing device may also use other various peripheral devices, such as a camera and/or microphone. Additional example details of the underlying operating system and circuitry in accordance with some embodiments will be discussed in turn with reference to FIG. 7a. As will be appreciated, the claimed invention is not intended to be limited to any particular kind or type of computing device.

Figure 1A:
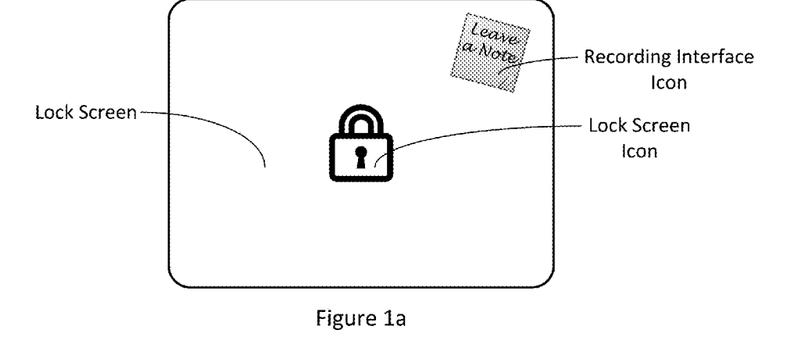
FIGS. 1*a-d* illustrate example lock screen shots of a computing device configured with a secure note system, in accordance with one or more embodiments of the present invention.

As can be seen in FIG. 1a, the lock screen shown includes an indication that the device is locked with a lock screen icon. As will be appreciated, different computing devices and their respective UIs have different lock screens, although they typically include some indication that it is a lock screen. In some instances, a computing device UI displays a login screen when in a locked state, especially when multiple users can use the same computing device (such as is the case with computers running Microsoft® Windows®). Accordingly, when referring to a lock screen herein, it is understood to include a login screen that requires entry of user credentials to gain access to the computing device and its operating system. To this end, when referring to a locked computing device herein, it is understood that the operating system UI is locked as well.

As previously described, the computing device may be set to automatically lock after a period of inactivity. In some cases, a user may need to perform an action to lock the computing device and thereby engage the lock/login screen. Computing devices such as desktops and laptops which allow for multiple user accounts (and therefore allow for multiple potential note recipients) typically have a menu option to log off or lock the device/UI for the currently active user account (i.e., lock the computing device). Other computing devices such as smart phones, tablets, and eReaders are sometimes configured with a lock button or UI control feature that, when pressed or otherwise engaged, puts the device/UI into a locked state. In any such cases, the locked state renders the device unusable by unauthorized users, unless there are locked state functions provisioned which provide limited access to the locked device, such as the secure note system described herein.

In some embodiments of the secure note system, the lock screen of a recipient's computing device may be configured to allow a user to leave a note using a recording interface. The recording interface may be configured in numerous different ways having varying levels of functionality and options for leaving a secure note. In some cases, the recording interface may be configured to include only a text box on the lock screen that allows users to save text notes. The saved notes may then be accessed by the intended recipient in numerous different ways, as described herein. In cases where the recording interface has additional functionality and options, the recording interface may be configured to include multiple screens and sub-screens that are navigated by user selections. The screens may include, for example, cancel buttons, save buttons, share buttons, and/or spell check buttons where appropriate to allow users to perform the corresponding action. Embodiments of the recording interface shown and described herein are provided as examples, and are not intended to limit the available options, functionality, or layout for recording notes using the secure note system.

In the embodiment shown in FIG. 1a, a recording interface icon (shown as a 'Leave a Note' sticky note icon) allows a user to access the recording interface of the secure note system. The use of icons as described herein is provided as one example format and is not meant to limit the manner in which the secure note system is navigated. For example, the secure note system may be configured to allow navigation using drop down menus or predetermined gestures. In this embodiment, the icon may be selected to access the recording interface such as by clicking on the icon (e.g., when using a mouse input device) or touching the icon (e.g., when using a touch screen input device). In some embodiments, after selecting the recording interface icon, the recording interface may be displayed on the lock screen of the computing device (e.g., as a pop-up window). In other embodiments, after selecting the recording interface icon, the recording interface may be displayed on a new screen, such as the recording interface menu screen shown in FIG. 2a.

Figure 1B:
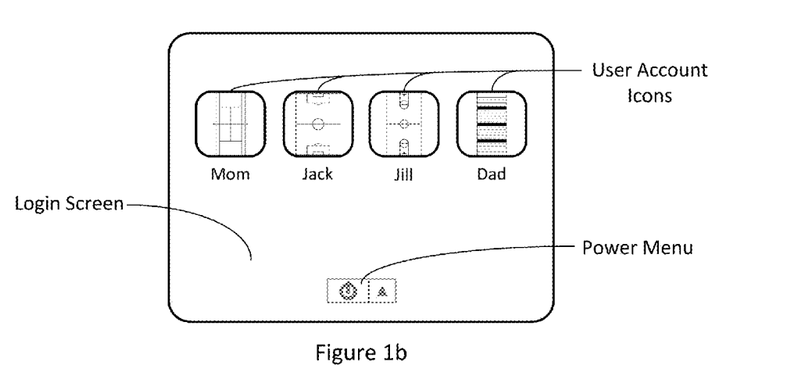

FIG. 1b shows a screen shot of an example lock screen (or login screen) on a computing device having multiple user accounts. As shown, there are four user accounts on the computing device (i.e., Mom, Jack, Jill, and Dad). As can be further seen, the login screen shown in FIG. 1b includes additional functionality, i.e., a power menu that allows a user to select a power option such as to shut down, restart, or sleep the computing device. The recording interface may be accessible from an initial login screen such as the one shown; however, the recording interface may then require additional information to determine which user should receive the recorded note, in some embodiments. With respect to the latter, computing devices may be configured with multiple user accounts; therefore, the recording interface may be accessed after selecting the user account icon of the intended recipient when a lock/login screen includes multiple user accounts.

Figure 1C:
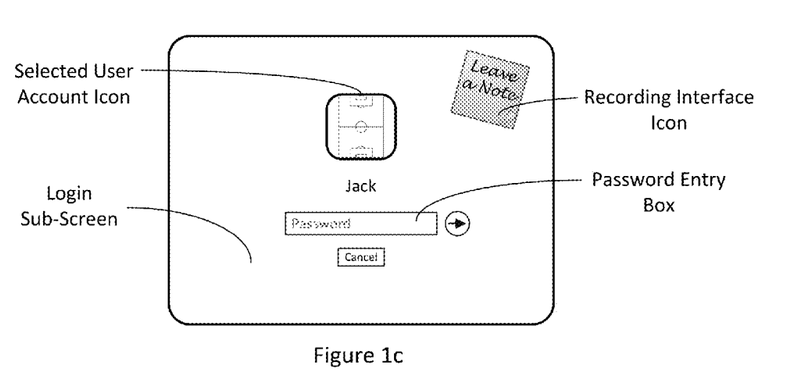

For example, FIG. 1c shows an example screen shot of a login sub-screen after Jack's user account icon was selected from the login screen shown in FIG. 1b. Only Jack's user account can be logged-in from this sub-screen after the proper password (or other lock screen access mechanism) is entered in the password entry box. As can be further seen with respect to FIG. 1c, the recording interface icon can be selected from the user-specific login sub-screen and notes recorded after engaging this recording interface icon will automatically be left for that user (Jack, in this example case). Consequently, a recording interface icon may be present on every user-specific login sub-screen where the corresponding user account owner has enabled the secure note system.

Figure 1D:
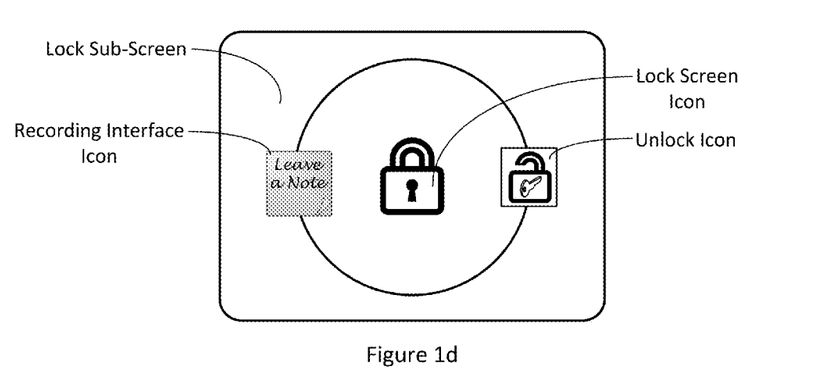

In some cases, the computing device may be configured to be unlocked without requiring a unique passkey. In these cases, the computing device may still be locked, but unlocking the computing device may only require an action that is well known or easily determined, such as swiping the lock screen icon in FIG. 1a to the right. For example, FIG. 1 d shows a lock sub-screen after a user has selected the lock screen icon in FIG. 1a. In this example, if the user swipes to the right or selects the unlock icon, then the device may be unlocked without needing to enter a unique passkey. If the user swipes to the left or selects the recording interface icon, the recording interface may be accessed. In such cases, where the computing device can be unlocked without knowing a unique passkey, a recorded note can still be secured, for example, by requiring a unique passkey to access the secure note after unlocking the computing device, in accordance with some embodiments of the present invention. For example, the secure note system may be configured to password protect each individual recorded note such that the recipient has to enter a pre-established note-access password before accessing a given note. Security may also (or alternatively) be provided at the note viewing interface level (rather than the note level) such that the recipient has to enter a password to open or otherwise access the note viewing interface. Numerous other security schemes and mechanisms to ensure that notes are only accessible to the intended recipient will be apparent in light of this disclosure, and the claimed invention is not intended to be limited to the various specific examples provided herein.

Figure 2A:
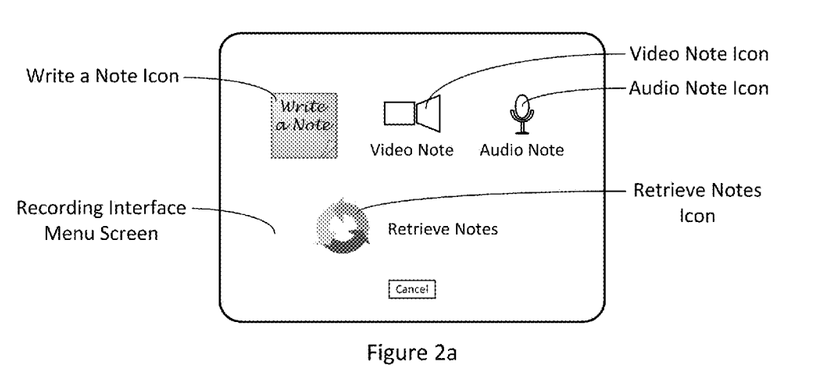
FIG. 2*a* shows an example screen shot of a user interface for a secure note system, in accordance with an embodiment of the present invention.

FIG. 2a shows an example screen shot of a recording interface menu screen for a secure note system, in accordance with an embodiment of the present invention. As shown, the options available on the menu screen are to write a note, record a video note, record an audio note, or retrieve notes. The write a note option may allow a user to type a textual note, or to hand-write or draw a note, as will be apparent in light of this disclosure. It should also be understood that audio notes include any type of audio recording and are not limited to recordings of a user's voice (e.g., Morse code audio message with taps). In this example embodiment, the different selectable options are presented as selectable icons as shown and will be discussed in turn; however, the selectable options may vary based on the configuration of the secure note system and available functionality. The write a note option will be primarily described herein in the context of leaving a typed or text note. However, other embodiments of the secure note system may allow a user to leave drawn notes, especially when the secure note system is being implemented on a computing device having a touch screen. In such example embodiments, the recording interface menu screen may include a selectable icon for leaving drawn notes or that option may be presented after selecting the write a note icon, for example. Numerous other note recording schemes and mechanisms can be used as will be appreciated in light of this disclosure and the examples provided herein are not intended to limit the available options, functionality, or layout of the secure note system as variously described herein.

Figure 2B:
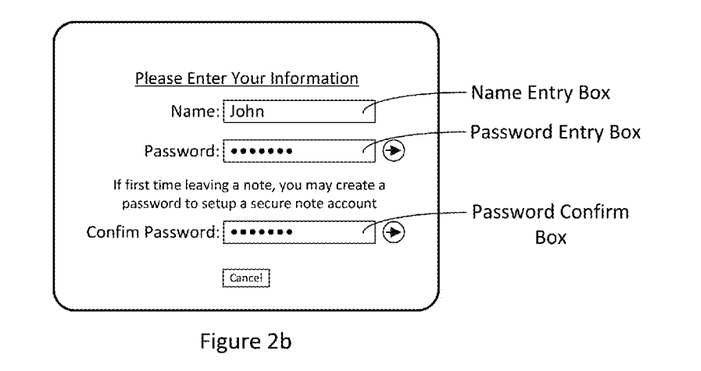
FIG. 2*b* shows an example screen shot of an optional user interface for a secure note system, in accordance with an embodiment of the present invention.

The recording interface may include one or more sub-screens to provide additional options or functionality, to provide information to the user, or to request information from the user. For instance, the example sub-screen in FIG. 2b provides an optional function of allowing users to create secure note accounts. A user can login to his/her account, for example, to record a new note under that account, or to retrieve a note previously recorded under that account if the optional retrieve notes function (described herein) is enabled. In some instances, a recorded note may be labeled or otherwise associated with the name entered on this sub-screen so as to identify the user who left the note. Note that this example sub-screen may be displayed either before the screen shown in FIG. 2a or after selecting one of the note icons from the menu shown in FIG. 2a.

Figure 3A:
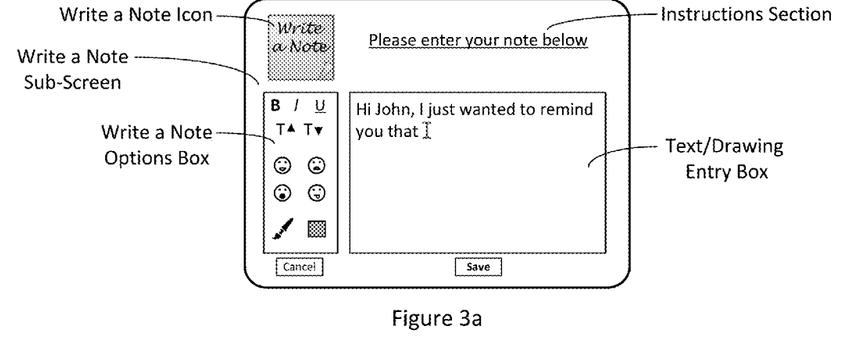
FIGS. 3*a-c* illustrate example screen shots of a user interface for writing a note, recording a video note, and recording an audio note, respectively, for a secure note system, in accordance with an embodiment of the present invention.
Figure 3B:
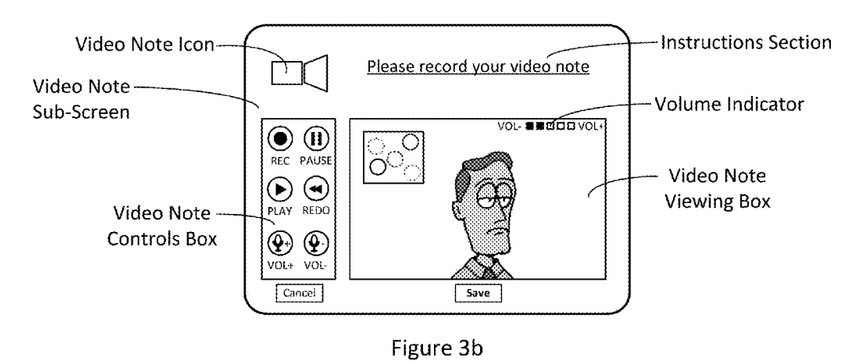
Figure 3C:
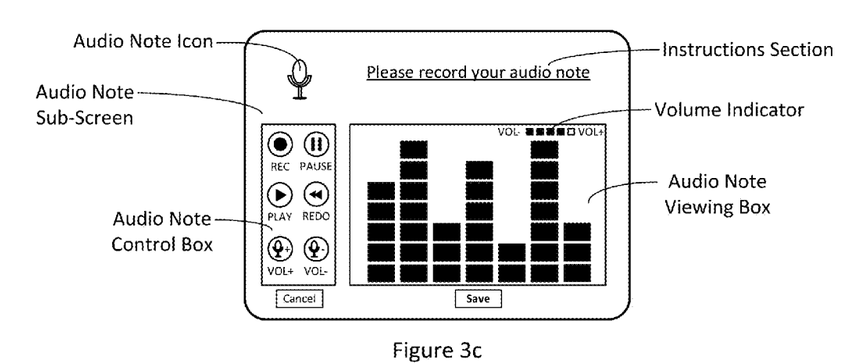

FIGS. 3a-c illustrate example screen shots of recording interface sub-screens for writing a note, recording a video note, and recording an audio note, respectively, for a secure note system, in accordance with an embodiment of the present invention. These sub-screens may be accessed, for example, by selecting the respective icons from the recording interface menu screen shown in FIG. 2a. In this embodiment, each screen has an instructions section (generally in the top right of the screen), a note type icon (generally in the top left of the screen), an options or control box (generally on the left side), and a text/drawing entry box or video/audio note viewing box (generally on the mid-right side of the screen). The instructions section may display instructions to help a user proceed with recording the note. The note type icon (written, video, or audio) may visually indicate the type of note that can be recorded using the sub-screen. The text entry box (for text notes) or drawing entry box (for hand-written or drawn notes) shown in FIG. 3a may allow a user to enter a written note. The viewing box (for video and audio notes) shown in FIGS. 3b-c may allow a user to view a manifestation of the note being recorded, or to assist with playback of that note after recording. The viewing box may also have a volume indicator that can be used to show the selected volume for recording (e.g., microphone volume) or playback (e.g., speaker volume).

As shown in FIG. 3a, the write a note sub-screen may have an options box to allow a user to perform certain operations when leaving a text or hand-written/drawn note. For example, the user can change the font style with respect to bold (B), italic (I), and/or underline (U), adjust the font size as desired (T▲ and T▼), select an emoticon to add to the entry box (to express the user's mood), or select different drawing options, such as the desired drawing brush or color. Numerous other functional and/or whimsical options may be provided, as will be appreciated. The entry box in FIG. 3a shows text being typed in by a user. However, as previously explained, the entry box may also allow a user to hand-write or draw a note, especially when the secure note system is running on a touch sensitive device. As shown in FIGS. 3b-c, the video and audio note sub-screens may have note controls boxes to allow a user to perform certain operations when leaving a video or audio note. For example, the user may be able to record (REC), pause, play, or re-record (redo) video or audio notes. Other controls may be available, such as volume controls to increase (VOL+) or decrease (VOL−) the microphone sensitivity when recording the video or audio notes. The volume controls may also allow a user to change volume during playback.

Figure 4:
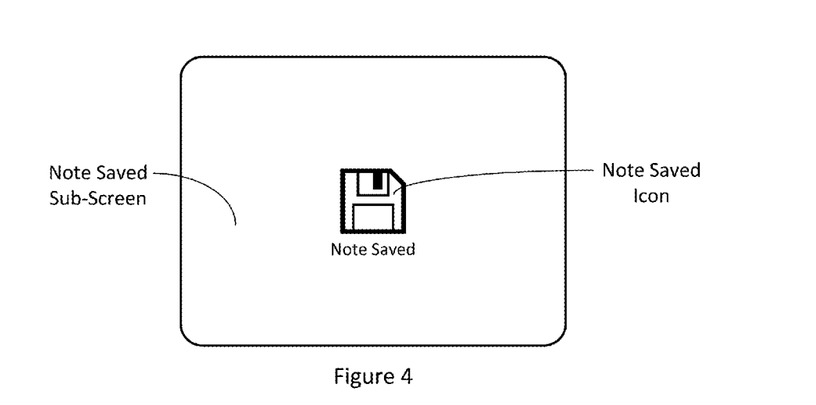
FIG. 4 illustrates an example screen shot of a user interface indicating a note has been saved for a secure note system, in accordance with an embodiment of the present invention.

After a user has completed writing or recording the note using, for example, one of the recording interface note sub-screens shown in FIGS. 3a-c, the user can save the note (e.g., by selecting the 'Save' button), thereby allowing the intended recipient to later access it. FIG. 4 illustrates an example screen shot of a recording interface sub-screen indicating a note has been saved, in accordance with an embodiment of the present invention. As previously described, the secure notes may be saved locally (e.g., using the computing device's internal storage or file system) and/or on a server via a networked or cloud-based storage system. In some cases, the note saved sub-screen shown in FIG. 4 may only be displayed for a short period of time, such as three seconds, to notify to the user that the recorded note was successfully saved to allow the recipient to later access it.

Since a saved note as described herein is electronic in nature (e.g., data file, digital signal, analog signal), it may be accessed or interacted with in a variety of different ways. For example, if a given secure note is saved locally, it may be accessed by the recipient from the lock screen of the device upon which it was recorded (e.g., using the retrieve notes interface described herein), or after unlocking the computing device, such as through a service with a viewing interface (such as a secure note smart phone application) or a third-party information management service (such as Microsoft® Outlook®). If a recorded note is saved on a server, it may be accessed through the Internet and/or other communication network, or retrieved through a cloud-based service with a viewing interface (such as a secure note smart phone application), for example.

Figure 5A:
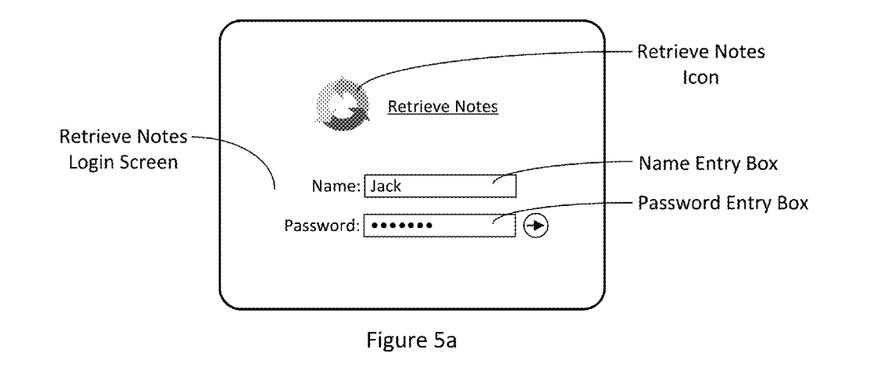
FIG. 5*a-b* illustrate example screen shots of a user interface for retrieving recorded notes from a secure note system, in accordance with an embodiment of the present invention.
Figure 5B:
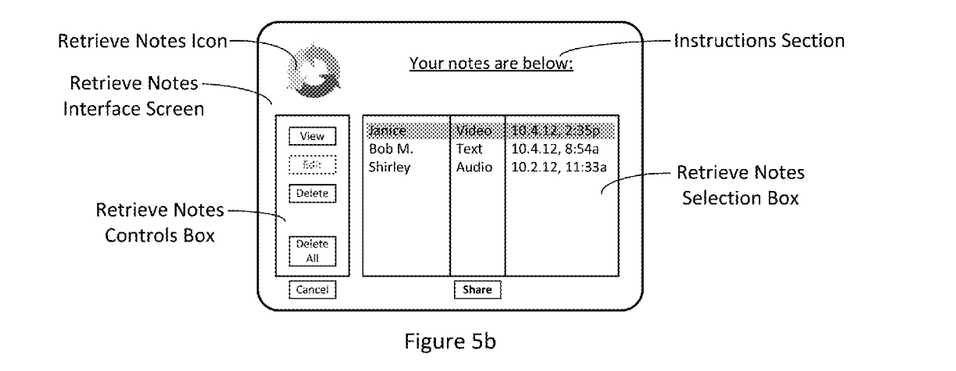

FIG. 5a-b illustrate example screen shots of a retrieve notes interface for a secure note system, in accordance with an embodiment of the present invention. As previously discussed with reference to FIG. 2a, a retrieve notes option may be included in the recording interface menu screen, for example, to allow users who recorded notes to access the notes they recorded, and/or to allow recipients to access the secure notes recorded for them. In the former case, note that such limited access can be provided while the computing device is locked. Once accessed, the secure note system may be configured to allow various interactions, such as viewing, editing, deleting, or sharing the recorded notes. FIG. 5a shows an example retrieve notes login screen, where a user who previously recorded one or more notes can login to interact with the recorded note(s). The secure note system may be configured such that, the name and password entered in the screen in FIG. 2b (the name and password entered by a user before recording a note) may be entered to retrieve the notes that user recorded. An intended recipient may also be able to login through the retrieve notes interface to view all of the secure notes recorded for him/her, which may be done while the device is locked or unlocked, as the case may be. In some instances, the recipient could setup a login name and unique passkey to be able to login using the retrieve notes interface.

FIG. 5b shows an example retrieve notes interface screen. This example interface screen is setup in a manner similar to the note sub-screens, having an instructions section, an identifying icon, and a control box. A retrieve notes selection box is also provided to allow the logged-in user or recipient to select the notes he/she wants to interact with. As previously explained, in some instances, the retrieve notes interface may be configured to allow a user who previously recorded notes limited access so as to only interact with his/her recorded notes. The retrieve notes interface may be configured to allow a recipient to interact with all of the notes that were recorded for that particular recipient. Thus, in some such cases, all of the recorded notes in the case of a single-user account computing device can be accessed by the recipient, while in the case of a multi-user account computing device, only the notes recorded specifically for the user account of that recipient could be accessed.

The retrieve notes controls box shown in FIG. 5b provides some available interactions, such as to view, edit, or delete the selected note, or to delete all of the notes. A share button may also be provided, such as the one shown at the bottom of the retrieve notes interface screen, to allow the logged-in user or recipient to share one or more of the recorded notes using email or other suitable such messaging system, for example. In some instances, the retrieve notes interface screen may be navigated or otherwise interacted with by using other known methods, such as using the delete key on a keyboard to delete a selected message(s). In some embodiments, the viewing interface previously described may be the same as the retrieve notes interface shown in FIG. 5b, and may be accessible after unlocking the computing device through, for example, a secure note smart phone application. The retrieve notes interface is presented as one example of how a secure note system may be configured to allow a recipient to interact with recorded notes from the lock screen of a computing device and is not intended to limit the available options, functionality, or layout for interacting with notes recorded using the secure note system.

Figure 6A:
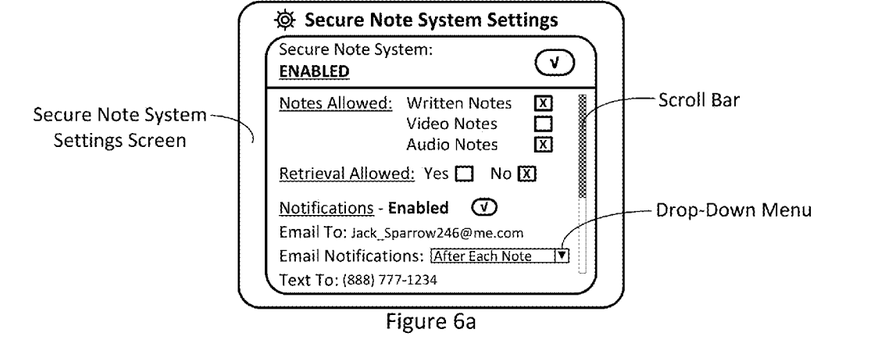
FIG. 6*a* illustrates an example screen shot of a user interface for configuring settings of a secure note system, in accordance with an embodiment of the present invention.

In some embodiments, the secure note system does not require any user configuration, such that the various features and functionalities are hard-coded or are otherwise provided by default. However, in other embodiments, some degree of user configurability may be provided. For instance, FIG. 6a shows a screen shot of an example secure note system settings screen that allows for user configuration, in accordance with an example embodiment of the present invention. Various different settings may be configured and the available settings may depend upon the available options, functionality, or layout of the secure note system. The settings can generally be accessed and configured by recipients (i.e., user account owners) when the computing device is unlocked and may be configured to require a unique passkey to change them.

The configurable settings shown in the example in FIG. 6a include enabling/disabling the secure note system, selecting what note types are allowed, selecting whether users can retrieve their recorded notes, and various notifications settings. Other settings may be available, such as options to configure the camera and microphone settings being used to record the video and audio notes. The notifications settings may include whether and how the recipient is notified after one or more notes are recorded for that recipient. As shown, the recipient has notifications enabled and notifications are being sent to an email address after each note is saved. The recipient has also entered a phone number to receive text message notifications. The secure note system can be configured to use any type of notification system. For example, after a note is recorded, the notifications system may be configured to display a notification on the lock screen of the computing device or to display a notification after the device is unlocked. In some instances, the recorded note may accompany the notification, for example, as an attachment or selectable hyperlink.

The degree of hard-coding versus user-configurability can vary from one embodiment to the next, and the claimed invention is not intended to be limited to any particular configuration scheme of any kind. Numerous variations will be apparent in light of this disclosure. For instance, other embodiments may always have the secure note system set by default to being enabled. Likewise, upon installation of the secure note system, the installer application may conduct a test to determine the type of recording and user input components are available (e.g., microphone, camera, touch screen, trackpad, etc) for the given computing device, and then automatically configure the secure note system to offer use of any detected such components at the recording interface. In such cases, user configurability can be limited to specifying an email address (or text address) for receiving notifications, if so desired. Other embodiments may not include such a notification feature.

Figure 6B:
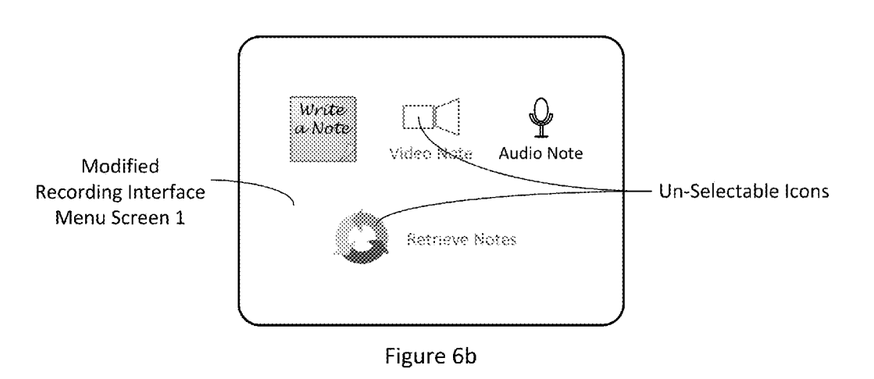
FIGS. 6*b-c* each illustrates an example screen shot of a user interface of a secure note system configured by a user to provide a sub-set of available note recording options, in accordance with an embodiment of the present invention.
Figure 6C:
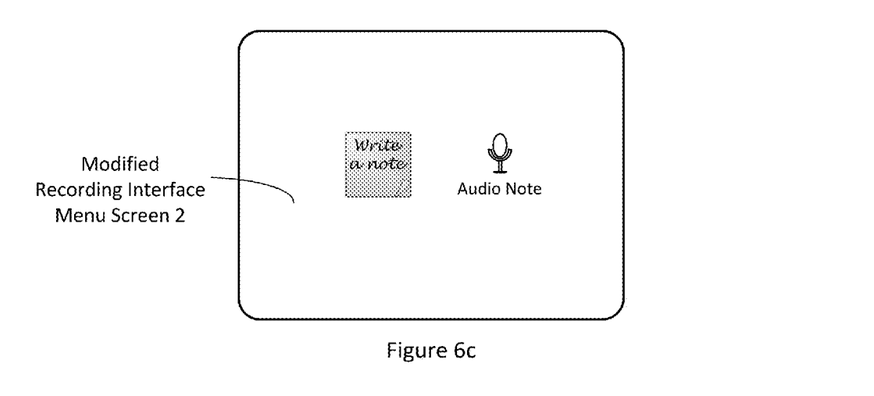

FIGS. 6b and 6c illustrate two example modifications to the recording interface menu screen shown in FIG. 2a based on the settings shown in FIG. 6a. As shown in the example settings menu of FIG. 6a, only written and audio notes are allowed; therefore, video notes and retrieval are disabled. In the first example modified recording interface menu screen shown in FIG. 6b, the recording interface menu makes the disabled features un-selectable (e.g., grayed-out or otherwise made un-selectable). In the second example modified recording interface menu screen shown in FIG. 6c, the disabled features are removed from the layout and only the allowed options (written notes and audio notes in this example scenario) are displayed. These two example modified recording interface menu screens are provided to illustrate that the secure note system may be configured in numerous different ways, and the examples provided herein are not intended to be exhaustive or to limit the claimed invention to the functions, options, or layouts disclosed.

Architecture

Figure 7A:
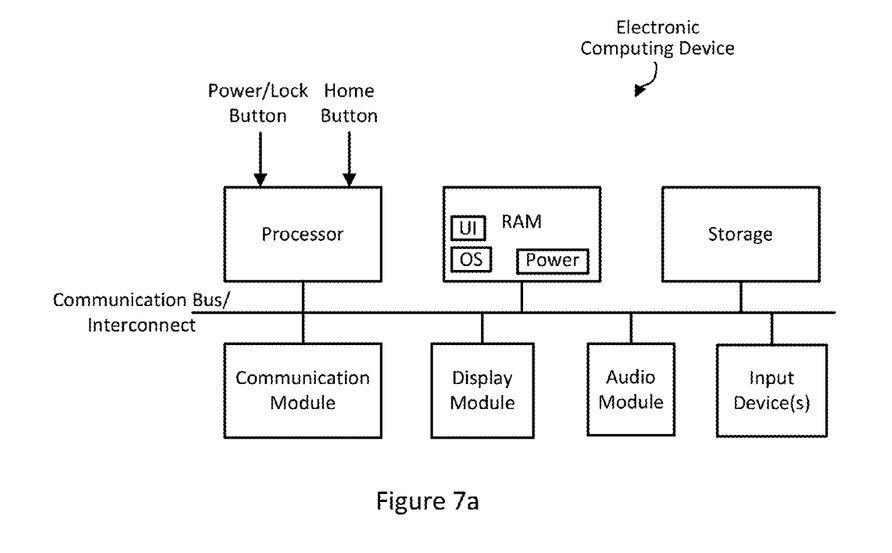
FIGS. 7*a* illustrates a block diagram of an electronic computing device configured in accordance with an embodiment of the present invention.

FIG. 7a illustrates a block diagram of an electronic computing device configured in accordance with an embodiment of the present invention. As can be seen, this example device includes a processor, random access memory (RAM), additional storage/memory, a communications module, a display module, an audio module, and one or more input devices. A communications bus and interconnect is also provided to allow inter-device communication. Other typical componentry and functionality not reflected in the block diagram will be apparent (e.g., battery, co-processor, etc). The input device(s) may include, for example, a keyboard, mouse, stylus, touch screen, trackpad, for navigation the computing device (to the extent possible, in the case of a locked screen) and entering a text note as described herein. The input device(s) may also include a camera or microphone, which may be used for recording video or audio notes. Further note that although a display module and input device(s) are shown as separate, the functions of both may be performed by a single touch screen display. The input devices are generally capable of translating a user's physical interactions into an electronic signal that can be manipulated or otherwise used to trigger a specific user interface action. The principles provided herein equally apply to touch sensitive devices (such as smart phones, tablets, and eReaders) and non-touch sensitive devices (such as desktop computers with external LED/CRT display).

In this example embodiment, the RAM includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device including a UI having a secure note system as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from a power/lock button and a home button (either of which can be physical or virtual buttons). The processor can also have a direct connection to a battery so that it can perform base level tasks even during sleep or low power modes. The RAM can be any suitable type of memory and size (e.g., 256 or 512 Mbytes SDRAM), and in other embodiments may be implemented with non-volatile memory or a combination of non-volatile and volatile memory technologies. The storage can also be implemented with any suitable memory and size (e.g., 2 GBytes of flash memory). The display can be implemented, for example, with a 6-inch E-ink Pearl 800×600 pixel screen with Neonode® zForce® touchscreen, or any other suitable display and touchscreen interface technology in the case of touch sensitive devices. In the case of non-touch sensitive devices, the display can be implemented with any monitor, screen, television, or other suitable display device. The communications module can be, for instance, any suitable 802.11b/g/n WLAN chip or chip set, which allows for connection to a local network so that content can be downloaded to the device from a remote location (e.g., content provider, etc, depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc.). The device may be smaller, for example, for smart phone and tablet applications and larger for computer and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology or based on input from non-touch screen devices, such as a mouse. The audio module can be configured, for example, to speak or otherwise aurally present the textual content of written notes, if preferred by the intended recipient. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher).

Client-Server System

Figure 7B:
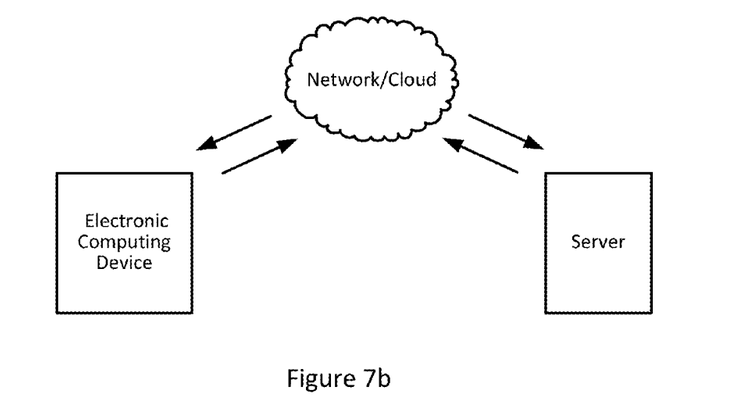
FIG. 7*b* illustrates a block diagram of a communication system including the electronic computing device of FIG. 7*a*, configured in accordance with an embodiment of the present invention.

FIG. 7b illustrates a block diagram of a communication system including the electronic computing device of FIG. 7a, configured in accordance with an embodiment of the present invention. As can be seen, the system generally includes an electronic computing device that is capable of communicating with a server via a network/cloud. In this example embodiment, the electronic device may be, for example a computer, laptop, tablet, eReader, mobile phone, smart phone, video game console, or any other computing device. The network/cloud may be a public and/or private network, such as a private local area network operatively coupled to a wide area network such as the Internet. In this example embodiment, the server may be programmed or otherwise configured to receive content requests from a user via an input device (such as a touch screen) and to respond to those requests by providing the user with requested or otherwise recommended content. Is some such embodiments, the server is configured to remotely provision a secure note system as provided herein to the computing device (e.g., via JavaScript or other browser based technology). In other embodiments, portions of the methodology are executed on the server and other portions of the methodology are executed on the device. Numerous server-side/client-side execution schemes can be implemented to facilitate a secure note system in accordance with an embodiment, as will be apparent in light of this disclosure.

Methodology

Figure 8:
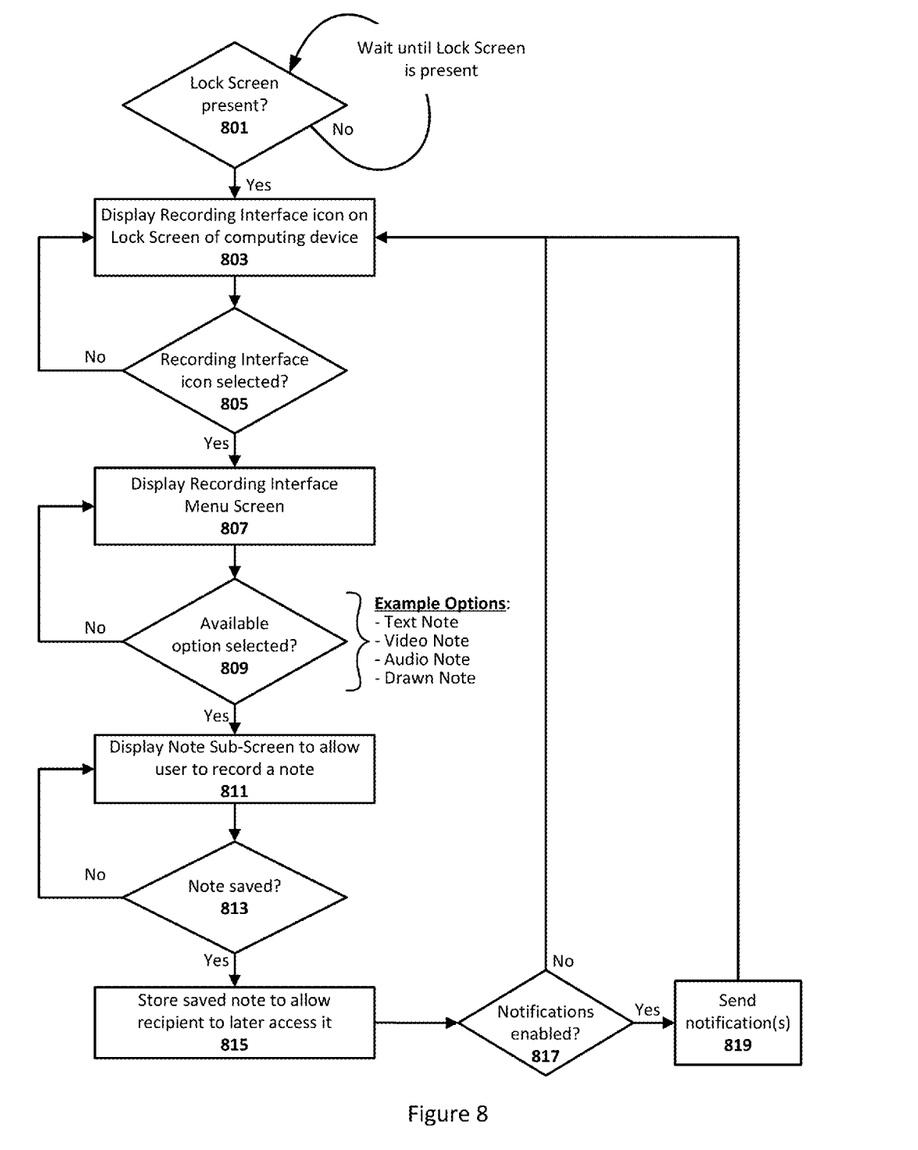
FIG. 8 illustrates a method for providing a secure note system for a computing device, in accordance with an embodiment of the present invention.

FIG. 8 illustrates a method for providing a secure note system for a computing device, in accordance with an embodiment of the present invention. The computing device may be a desktop, laptop, tablet, mobile phone, set-top box, game console, or other suitable computing system. This example methodology may be implemented, for instance, by the UI module of the computing device shown in FIG. 7a, or the computing device shown in FIG. 7b (e.g., with the UI provisioned to the client by the server). To this end, the UI can be implemented in software, hardware, firmware, or any combination thereof, as will be appreciated in light of this disclosure.

As can be seen, in this example case, the method includes determining 801 if a lock screen of a given computing device is present such that access to the computing device is either actually restricted (e.g., pass code is required to gain full access to device) or at least impliedly restricted (e.g., it would be usual for a person to access someone's computing device without permission by navigating past an unsecured lock screen having no pass code). In any such cases, once the lock screen is present, the method operates to allow a user to record a secure note from the lock screen of the computing device.

Once the lock screen is present, the method continues with displaying 803 a recording interface icon on the lock screen of the computing device. As previously described, in some instances, the entire recording interface may be displayed on the lock screen, such as a text entry box and save button, whereby a user can simply enter text notes and save them all from the lock screen to allow the recipient to access the saved note after the device is unlocked. In other embodiments, some further limited interaction may be allowed. For instance, and with further reference to the example case in FIG. 8, the method continues with determining 805 if the recording interface icon has been selected. If not, the method continues displaying 803 the recording interface icon on the lock screen and waiting for user input. If, on the other hand, the recording interface icon has been selected, then the method continues with displaying 807 a recording interface menu screen. As previously explained, the menu screen may have one or more note options to choose from, such as options to record a text note, video note, audio note, or a drawn note. As also previously described, the options may further include a retrieve notes function that may allow users and/or recipients to interact with saved recorded notes.

The method continues with determining 809 if an available option has been selected. If not, the method continues displaying 807 a recording interface menu screen and waiting for user input. On the other hand, once a user selects an available note recording option, the method continues with displaying 811 a corresponding note sub-screen to allow the user to record the note. For example, if the user selects to record a video note, a sub-screen such as the one shown in FIG. 3b may be displayed to allow the user to record a video note. Likewise, if the user selects to record an audio note, a sub-screen such as the one shown in FIG. 3c may be displayed to allow the user to record an audio note. Similarly, if the user selects to record a text note, a sub-screen such as the one shown in FIG. 3a may be displayed to allow the user to record a text note.

Such a note recording screen may be displayed until, for instance, the user hits the cancel button (which may be configured to go back one screen or cancel out to the lock screen), the save button (which saves the recorded note and may cause a saved notification screen to be displayed, such as the note saved sub-screen shown in FIG. 4), or a period of time elapses (e.g., the note recording may be canceled and the lock screen displayed after a predetermined period of inactivity, such as three minutes).

Continuing with the example case in FIG. 8, the method continues with determining 813 if the note has been saved. If not, the method continues displaying 811 the corresponding note sub-screen and waiting for user input, until a time-out occurs. On the other hand, once the note has been saved, the method continues with storing 815 the note to allow the intended recipient to later access it. As previously described, after the recorded note is saved, it may be accessed or interacted with in a variety of different ways.

The method continues with determining 817 if notifications are enabled. If not, the method continues at 803, such that the recording interface icon is once again displayed on the lock screen of the computing device so that other notes may be left as desired. However, if notifications are enabled, then the method may also include sending 819 one or more notifications. In some cases, if the secure note system is configured to send notifications, a notification action may occur, for example, after the recorded note has been saved. For instance, a notification may be sent to the recipient's email thereby notifying that recipient that a secure note has been recorded. In some such example cases, a copy of the secure note may be included in the email or text message as an attachment or through a hyperlink for the intended recipient to access.

Numerous variations and embodiments will be apparent in light of this disclosure. One example embodiment of the present invention provides a computing device including a display for displaying content, and a secure note system accessible from a lock screen of the computing device and configured to receive electronic notes when the computing device is in a locked state and save the electronic notes such that they can be later accessed by a recipient having access to the locked computing device. In some cases, the computing device is one of a desktop computer, laptop, netbook, tablet, eReader, mobile phone, smart phone, personal digital assistant (PDA), video game console, handheld gaming console, portable media player, and a handheld navigation system. In some instances, the secure note system is configured to receive at least one of text notes, video notes, audio notes, and drawn notes. In some cases, the computing device also includes a camera and/or a microphone to facilitate recording video notes and/or audio notes. In some instances, the saved notes are later accessed by at least one of using a passkey while the device is locked, unlocking the device, and using a passkey after the device is unlocked. In some cases, the secure note system includes a note recording user interface accessible from the lock screen that facilitates recording the notes from the locked device. In some instances, the secure note system includes a note viewing user interface accessible only when the device is unlocked to allow the recipient to perform at least one of viewing, editing, deleting, and sharing the saved notes. In some cases, the secure note system includes a retrieve notes interface accessible from the locked device to facilitate at least one of viewing, editing, deleting, and sharing recorded notes by a user that left one or more recorded notes. In some instances, the secure note system is further configured to provide a notification to the recipient after recorded notes are saved. In some cases, the secure note system is user-configurable.

Another embodiment of the present invention provides a computer readable medium encoded with instructions that when executed by one or more processors, cause a process to be carried out. The process includes providing a note recording user interface for display on a lock screen of a computing device, the lock screen restricting access to the device, wherein the note recording user interface is configured to receive electronic notes, and saving recorded electronic notes such that they can be later accessed by an intended recipient having access to the computing device. In some cases, the note recording user interface is configured to receive at least one of text notes, video notes, audio notes, and drawn notes. In some instances, the recorded notes are accessible by at least one of using a passkey while the device is locked, unlocking the device, and using a passkey after the device is unlocked. In some cases, the recorded notes are accessible via a note viewing user interface that allows the intended recipient to perform at least one of viewing, editing, deleting, and sharing the recorded notes. In some instances, the process further includes the preliminary step of providing a selectable recording interface icon on the lock screen of the computing device. In some cases, the process further includes the step of providing a notification to inform the intended recipient when notes have been received. In some instances, the process further includes providing a retrieve notes interface for display on the locked computing device, the retrieve notes interface configured to allow access to previously recorded notes.

Another embodiment of the present invention provides a computer readable medium encoded with instructions that when executed by one or more processors, cause a process to be carried out. The process includes providing a note recording user interface for display on a lock screen of a computing device, the lock screen restricting access to the device, receiving an electronic note entered via the note recording user interface for an intended recipient, saving the electronic note, providing a note viewing user interface for display when the computing device is unlocked, and accessing the saved electronic note via the note viewing interface in response to input by the intended recipient, wherein the note viewing user interface allows the intended recipient to perform at least one of viewing, editing, deleting, and/or sharing the saved electronic note. In some cases, the process further includes the step of providing a notification to inform the intended recipient that a note has been recorded, wherein the notification includes a copy of the recorded note. In some instances, the note viewing interface is further configured to lock using a passkey so as to restrict access to the note viewing interface.

As used herein in the specification and claims, the term "and/or," when used in a list of two or more items, means that any one of the listed items can be employed by itself, or any combination of two or more of the listed items can be employed. For example, if a function is described as being based on A, B, and/or C, the function can be based on: A alone; B alone; C alone; A and B in combination; A and C in combination; B and C in combination; or A, B, and C in combination.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computing device, comprising:
a display for displaying content; and
a secure note system accessible from a lock screen of the computing device via a prompt that solicits an unauthorized user of the computing device to locally provide to the computing device an electronic note intended for a recipient authorized to unlock the computing device, the secure note system configured to receive the electronic note from the unauthorized user when the computing device is in a locked state and save the electronic note such that it can be later accessed by the recipient and not by other unauthorized users;
wherein the secure note system includes a retrieve notes interface accessible from the locked device to facilitate at least one of viewing, editing, deleting, and sharing one or more previously recorded electronic notes by an unauthorized user that provided the one or more previously recorded electronic notes, but not by other unauthorized users;
wherein the secure note system includes a note viewing user interface accessible after the device is unlocked to allow the recipient to perform at least one of viewing, editing, deleting, and sharing the saved electronic notes; and
wherein the secure note system is further configured to provide a notification to the recipient that one or more electronic recorded notes have been received.

2. The device of claim 1 wherein the computing device is one of a desktop computer, laptop, netbook, tablet, eReader, mobile phone, smart phone, personal digital assistant (PDA), video game console, handheld gaming console, portable media player, and a handheld navigation system.

3. The device of claim 1 wherein the secure note system is configured to receive at least one of text notes, video notes, audio notes, and drawn notes.

4. The device of claim 1 further comprising at least one of a camera and a microphone to facilitate recording at least one of video notes and audio notes.

5. The device of claim 1 wherein access to the computing device provided by the secure note system to the unauthorized user is limited to providing electronic notes and to accessing electronic notes previously provided by the unauthorized user.

6. The device of claim 1 wherein the secure note system is an application that is distinct and separate from applications available when the computing device is unlocked.

7. The device of claim 1 wherein the notification comprises at least one of: a notification on the lock screen of the computing device, a notification after the computing device is unlocked, and an electronic message sent from the computing device to a mobile communication device associated with the recipient.

8. The device of claim 1 wherein the secure note system is user-configurable.

9. A non-transitory computer readable medium encoded with instructions that when executed by one or more processors, cause a process to be carried out, the process comprising:
providing a note recording user interface for display on a lock screen of a computing device, the lock screen restricting access to the device, wherein the note recording user interface is configured to solicit an unauthorized user of the computing device to locally provide to the computing device an electronic note intended for a recipient authorized to unlock the computing device, and to receive the electronic note;

saving the electronic note such that it can be later accessed by the recipient and not by other unauthorized users;

providing a retrieve notes interface for display on the lock screen the retrieve notes interface configured to allow an unauthorized user access to previously saved electronic notes provided by that unauthorized user, but not to previously saved electronic notes provided by other unauthorized users; and providing a notification to inform the recipient that one or more electronic notes have been received;

wherein saved electronic notes are accessible after the computing device is unlocked via a note viewing user interface that allows the recipient to perform at least one of viewing, editing, deleting, and sharing the recorded electronic notes.

10. The computer readable medium of claim 9 wherein the note recording user interface is configured to receive at least one of text notes, video notes, audio notes, and drawn notes.

11. The computer readable medium of claim 9 wherein access to the computing device via the note recording user interface to the unauthorized user is limited to providing electronic notes and to accessing electronic notes previously provided by the unauthorized user.

12. The computer readable medium of claim 9 wherein providing a note recording user interface includes providing a selectable recording interface icon on the lock screen of the computing device, the icon comprising a prompt that graphically solicits the unauthorized user to provide the electronic note.

13. The computer readable medium of claim 9 wherein the notification comprises at least one of: a notification on the lock screen of the computing device, a notification after the computing device is unlocked, and an electronic message sent from the computing device to a mobile communication device associated with the recipient.

14. A non-transitory computer readable medium encoded with instructions that when executed by one or more processors, cause a process to be carried out, the process comprising:

providing a note recording user interface for display on a lock screen of a computing device, the lock screen restricting access to the device, and the note recording user interface being part of a secure note system and comprising a prompt that graphically solicits an unauthorized user to provide an electronic note;

receiving an electronic note entered via the note recording user interface for an intended recipient authorized to unlock the computing device;

saving the electronic note;

providing a notification to inform the intended recipient that a note has been recorded; and providing a retrieve notes interface for display on the lock screen, the retrieve notes interface configured to allow an unauthorized user access to previously saved electronic notes provided by that unauthorized user, but not to previously saved electronic notes provided by other unauthorized users;

wherein saved electronic notes are accessible after the computing device is unlocked via a note viewing user interface that allows the recipient to perform at least one of viewing, editing, deleting, and sharing the electronic recorded notes.

15. The computer readable medium of claim 14, wherein the notification comprises at least one of: a notification on the lock screen of the computing device, a notification after the computing device is unlocked, and an electronic message sent from the computing device to a mobile communication device associated with the recipient.

16. The computer readable medium of claim 14 wherein the secure note system is an application that is distinct and separate from applications available when the computing device is unlocked.

* * * * *